United States Patent Office 3,839,538
Patented Oct. 1, 1974

3,839,538
PROCESS FOR THE MANUFACTURE OF BORON HALIDES
Gunter Kratel, Sankt Mang, Gunter Stohr, Kempten am Gohlenbach, Georg Vogt, Sankt Mang, and Gunter Wiebke, Munich, Germany, assignors to Elektroschmelzwerk Kampten GmbH, Munich, West Germany
No Drawing. Filed Mar. 14, 1972, Ser. No. 234,675
Claims priority, application Germany, Mar. 20, 1971, P 21 13 591.1
Int. Cl. C01b 9/00, 35/00
U.S. Cl. 423—292
6 Claims

ABSTRACT OF THE DISCLOSURE

The present invention relates to the production of boron halides by the reaction of alkaline earth metal borides with anhydrous hydrogen halides. The alkaline earth metal boride, such as calcium hexaboride, is reacted with an anhydrous hydrogen halide, such as hydrogen chloride or hydrogen bromide, at temperatures ranging from 300° to 1800° C., and preferably between 500° and 600° C., the reaction being preferably effected in a fluidized or turbulent bed of the alkaline earth metal boride in particulate form.

---

The present invention relates to the production of boron halides by reacting, preferably in fluidized bed form, alkaline earth metal borides with anhydrous gaseous hydrogen halides at temperatures ranging from 300° to 1800° C., and preferably at temperatures between 500° and 650° C.

Boron trihalides are colorless, volatile compounds extremely susceptible to moisture. The boron halides are valuable catalysts and extensively used in chemical industry, particularly as intermediates in the production of metal borohydrides and various boron-hydrogen compounds. They are also useful in the refining of various metals, for use in fire extinguishers, and for various other purposes.

Boron halides have been produced in the past by various methods such as by the Oersted process which comprises reacting a halogen with a mixture of carbon and boron oxide or other oxygen compound of boron. The control of this reaction, however, is rather complicated and the yield, based on either halogen or boron compound, is poor, resulting from the fact that the reaction temperature is higher than the melting point of the boron compound, thus causing the reaction mixture to become rolled into a solid mass so that passage of the gaseous hydrogen halide through the mixture becomes impossible. Also, the byproduct phosgene, formed in the reaction, can be separated from the desired boron trihalide only with difficulty because of the fact that the condensation temperatures of the two compounds are quite close together.

Boron halides have also been produced in the past by reacting boron carbide with a halogen. In this case, however, the yields, based on boron carbide, are quite poor because of the fact that the carbon liberated during the reaction forms an impermeable layer of carbon on the boron carbide and thus inhibits further reaction. Furthermore, the high reaction temperature causes a sintering of the boron carbide which causes a blocking of the reaction vessel. Also, because only free halogen can be used in the reaction, the reaction product contains some unreacted halogen which can be separated only by complicated and expensive methods.

According to the present invention, a procedure has been discovered for the production of boron halides which is free from the disadvantages of the prior art processes.

The present improved process comprises reacting alkaline earth metal borides at elevated temperatures with anhydrous gaseous hydrogen halides.

While borides of any of the alkaline earth metals may be satisfactorily employed, magnesium and calcium borides, and in particular calcium hexaboride, are preferred. The latter compound is produced on a large technical scale from calcium compounds, carbon and boron compounds.

Any of the hydrogen halides can be used in the process of the present invention, the use of hydrogen chloride and hydrogen bromide being preferred. The reactant gas should be dried before introduction into the reaction zone.

The reaction of the instant invention is carried out at temperatures ranging from 300° to 1800° C., but is preferably effected within the temperature range of 500°–650° C., since at temperatures below about 500° C. some boron hydrides are also formed. It has been discovered, however, that when operating at such temperatures the formation of such contaminants can be inhibited by the addition of small amounts of halogen (for example, 1–10%, by weight, based on the hydrogen halide) with the reactant hydrogen halide. Furthermore, when operating within this preferred temperature range the tendency for the formation of molten slags of calcium halides is reduced with the result that the efficiency of the operation of the process is increased.

Under preferred operating conditions substantially quantitative yields, based on the hydrogen halide or alkaline earth metal boride can be obtained. The boron halide formed is generally of quite high purity and may be as high as 99.9%, and thus generally requires no further purification.

The reaction can be satisfactorily effected in various ways. For example, the hydrogen halide can be passed through a stationary, moving or turbulent (fluid) bed of the heated alkaline earth metal boride. The residue of alkaline earth metal halide, such as calcium halide, can be easily removed from the reaction zone by means of ports or valves. When operating at the preferred temperatures of 500°–650° C. the resulting alkaline earth metal halide will not melt so that the reactant alkaline earth metal boride is not contaminated with a slag.

The alkaline earth metal boride is preferably supplied to the reaction vessel in a particle size ranging from 0.1 to 30 mm. in diameter. Particles smaller than the preferred range are preferably pelletized before introduction into the furnace, although small particles and dusts can be easily removed from the furnace by entrainment with the reaction gases from the reactor.

The reactor can be heated to the desired reaction temperature by any convenient means, by either direct or indirect heat. For example, the reactor can be maintained at the desired temperature by means of heating jackets or by heating the bottom of the reactor at the point of entry of the reactants. Or, the reaction temperature can be maintained by adding to the reactant hydrogen halide a halogen in an amount up to 90%, based on the amount of hydrogen halide used as the halogenating agent.

The following specific examples are given to further illustrate the invention. It is specifically understood, however, that they should not be regarded as limiting in any way the invention hereinabove disclosed.

EXAMPLE 1

In this experiment, the reactor was a vertically positioned quartz tube 300 mm. in length and 30 mm. in diameter. Into this reactor was placed 200 grams of calcium hexaboride having a particle size of 2–5 mm. diameter. While maintaining the external temperature of the reactor at 650° C. by means of an electrical heater anhydrous hydrogen chloride was passed through the heated calcium hexaboride particles at a rate of 0.5 kg. per hour. The colorless gaseous boron trichloride leaving the reactor was condensed at −30° C. Analysis of the condensate showed that it contained 99.9% boron trichloride.

EXAMPLE 2

In this experiment, the reactor consisted of a vertically positioned graphite tube of 300 mm. length and 300 mm. diameter. Into this reactor was placed 200 grams of calcium hexaboride having a particle size of 2–5 mm. diameter. While maintaining the reaction temperature at 840° C. by means of resistance heating anhydrous hydrogen bromide was passed through the heated calcium hexaboride particles at the rate of 0.7 kg. per hour. The resulting boron tribromide was condensed as described in Example 1 and upon analysis found to be in excess of 95% purity.

What is claimed is:

1. Process for the production of a boron trihalide selected from the group consisting of a trichloride and a tribromide comprising reacting
    (A) an alkaline earth metal boride in particulate form selected from the group consisting of calcium boride and magnesium boride, with
    (B) an anhydrous gaseous hydrogen halide selected from the group consisting of hydrogen chloride and hydrogen bromide,
    (C) at a temperature between 300° C. and 1800° C., and
    (D) recovering the resulting boron trihalide.

2. Process according to Claim 1, wherein the alkaline earth metal boride is calcium hexaboride.

3. Process according to Claim 1, wherein said reaction is effected at temperatures ranging from 500° to 650° C.

4. Process according to Claim 1, wherein said alkaline earth metal boride is in particles sizes ranging from 0.1 mm. to 30 mm. in diameter.

5. Process according to Claim 1, wherein said alkaline earth metal boride is maintained in the form of a fluidized bed of particles while said reaction is being effected.

6. Process according to Claim 1, wherein a halogen is mixed with said hydrogen halide in an amount up to 90% by weight of said hydrogen halide.

References Cited

UNITED STATES PATENTS

| | | | |
|---|---|---|---|
| 3,743,698 | 7/1973 | Kratel et al. | 423—292 |
| 2,589,391 | 3/1952 | Hutchinson et al. | 423—292 |
| 2,989,375 | 6/1961 | May et al. | 423—292 |
| 3,144,306 | 8/1964 | May et al. | 423—292 |

FOREIGN PATENTS

| | | | |
|---|---|---|---|
| 683,703 | 12/1952 | Great Britain | 423—659 |

OTHER REFERENCES

Greenwood et al.: "Some Reactions of Metal Borides," J. Chem. Soc., 1965 (January), 545–9.

Post: "Refractory Binary Borides," Boron, Metallo Boron Compounds & Boranes, Adams (ed.), Interscience, New York, 1964, p. 349.

OSCAR R. VERTIZ, Primary Examiner

B. E. HEARN, Assistant Examiner